April 4, 1961 G. R. DEMPSTER ET AL 2,978,122
TRANSPORTING EQUIPMENT
Filed Aug. 20, 1956 3 Sheets-Sheet 1

INVENTORS
GEORGE R. DEMPSTER,
WILLIAM A. HERPICH,
BY
ATTORNEYS

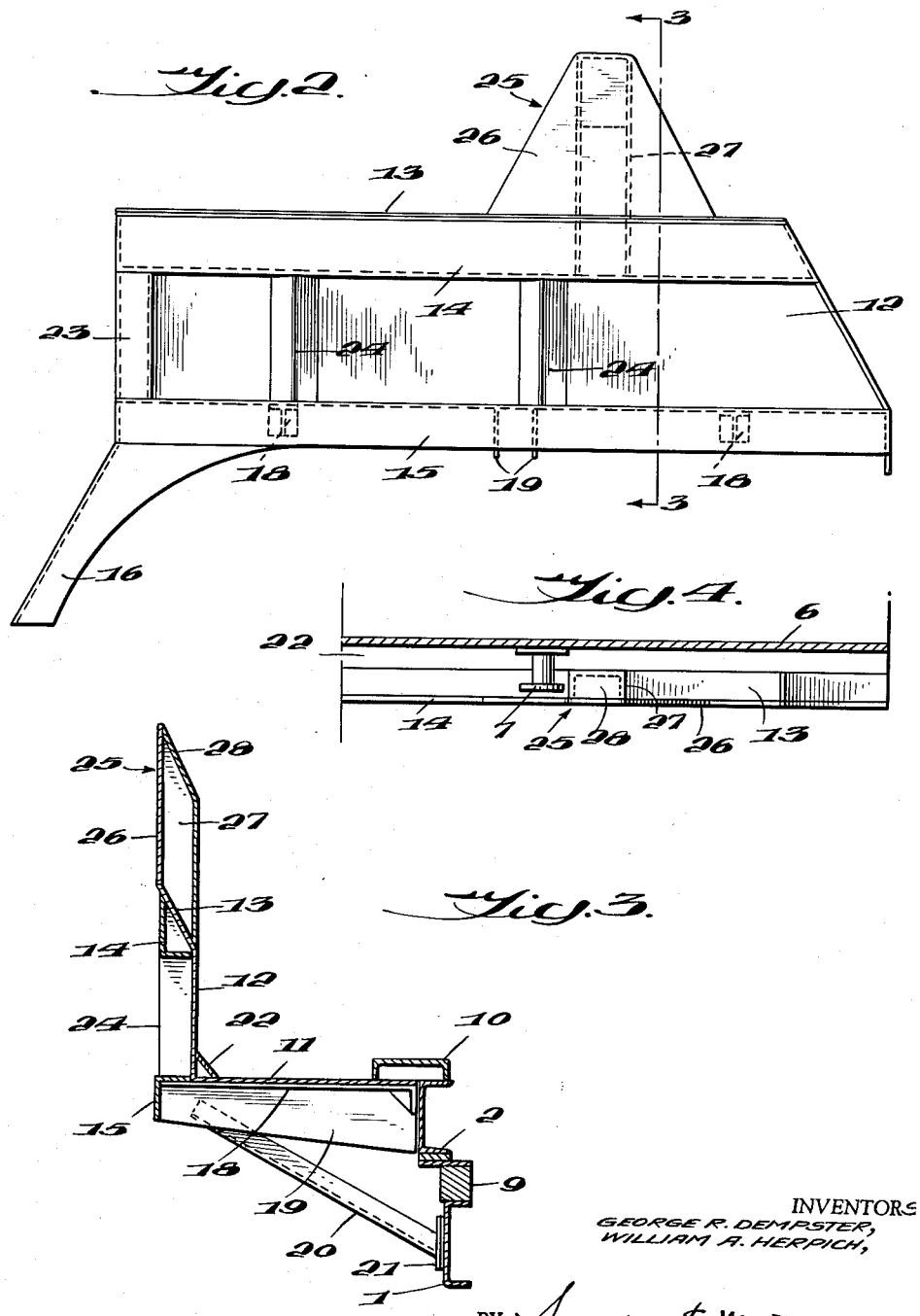

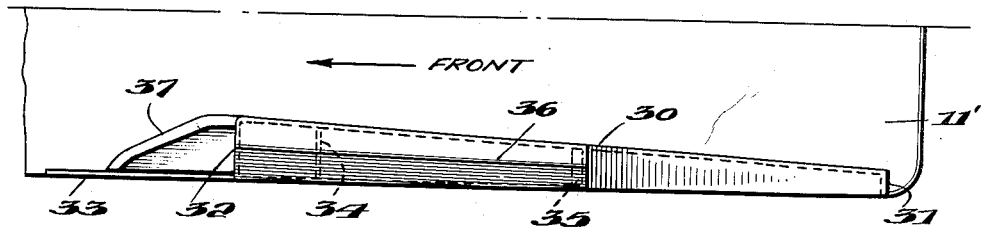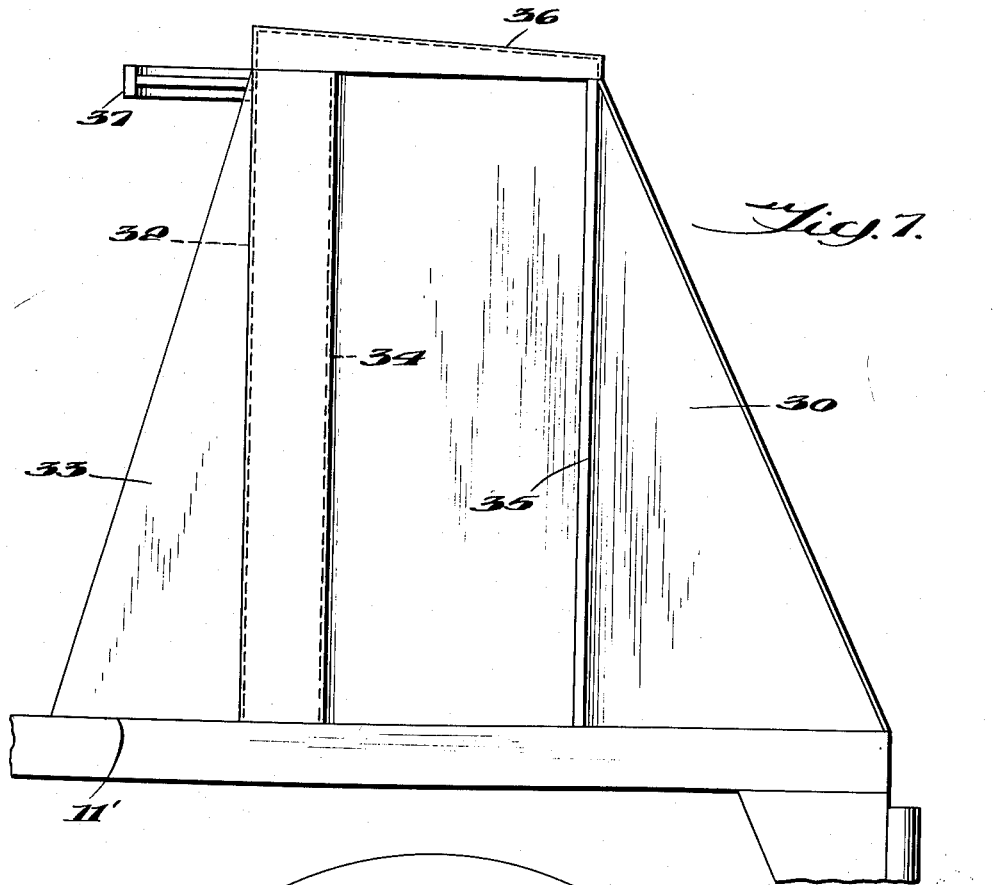

United States Patent Office

2,978,122
Patented Apr. 4, 1961

2,978,122

TRANSPORTING EQUIPMENT

George R. Dempster and William A. Herpich, Knoxville, Tenn.; said Herpich assignor to Dempster Brothers, Inc., Knoxville, Tenn., a corporation of Tennessee Filed Aug. 20, 1956, Ser. No. 604,933

11 Claims. (Cl. 214—75)

This invention relates to improvements in transporting equipment, and more particularly of the character set forth in the Dempster patent, No. Re. 23,546, granted September 9, 1952.

As set forth in the aforesaid patent, it has been the practice heretofore to provide a vehicle with mechanism for lifting a container from a position on the ground by upward movement of an elevator on a carriage to an elevated position and thereafter shifting the carriage and the container forwardly of the vehicle, after which the container may be lowered by the elevator to a seated position upon the vehicle at a forward portion thereof. The container remains in the seated position on the vehicle during transportation, and while the container may be filled with material, the movement of the vehicle during transportation may result in a shifting of the container thereon.

It has also been proposed, according to the Bamberg patent, No. 2,424,429, granted July 22, 1947, to lock the container securely in its lowered position on the vehicle during transportation by means of one or more hooks which are shifted into engaged connection with the container when the carriage is lowered, to set the container down on the vehicle. The mechanism provided therein has not been entirely satisfactory in service under different conditions, and is not readily applicable to many types of containers now in use.

One object of this invention is to improve the construction of the locking device for such container, to overcome the objections heretofore encountered in service, and to ensure of securely locking the container in place upon the vehicle and to hold it during transportation.

Another object of the invention is to provide for effective retaining of a container on the hoisting unit or vehicle during transportation to prevent the container from sliding either rearwardly or laterally of the vehicle out of its supported position.

Still another object of the invention is to provide retaining means for the container which will serve not only to lock the container in place, but also as guide means to permit the container to center itself as it is being lowered into carrying position and also as skirting for the vehicle, forming complete fenders over the rear tires.

A still further object of the invention is to simplify and improve locking means to retain a container in place and to utilize outrigger portions of the vehicle, both for retaining the container and holding it in place effectively against sidewise and rearward movement, as well as to provide a complete fender over the rear tire and a container guide to center the container in its carrying position.

These objects may be accomplished, according to certain embodiments of the invention by providing outrigger and skirting structures on the vehicle on opposite sides of the support for the container thereon, tending to prevent a lateral shifting of the container from its seated position on the holder plate provided on the chassis. Retainer members are also provided on the outrigger structures as abutments or stops coacting with portions of the container tending to prevent rearward shifting of the container from its seated position during transportation. Provisions are made for centering the container between the outrigger sections so as to insure of proper retention of the container in place during transportation.

These embodiments of the invention are illustrated in the accompanying drawings, in which:

Fig. 2 is a side elevation of the outrigger and skirting, with the retainer for the container secured thereon;

Fig. 3 is a vertical cross section therethrough on the line 3—3 in Fig. 2;

Fig. 4 is a partial top plan view thereof, showing the relation of the container to the retainer therefor;

Fig. 6 is a top plan view of a portion of the hoisting unit, showing a modification of the container guide and lock; and Fig. 7 is a side elevation thereof.

Figure 1:
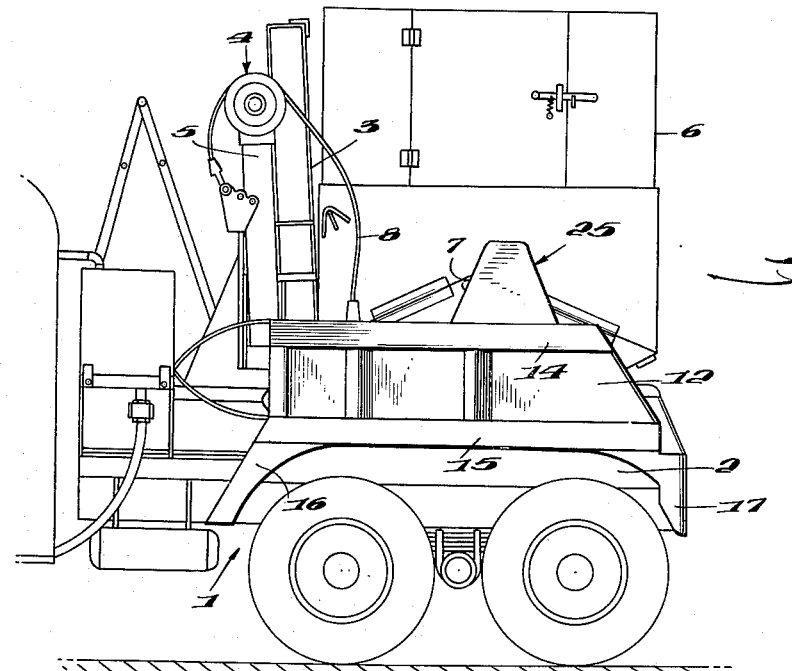
Fig. 1 is a side elevation of the transporting equipment showing the invention applied thereto, with the container in its loaded position on the chassis.

The invention is illustrated and described in connection with transporting equipment of the character set forth more in detail in the aforesaid patents, No. Re. 23,546 and No. 2,424,429, comprising a motor vehicle or truck chassis, power operated in the usual manner, to which the invention may be applied. The motor vehicle chassis is generally designated by the numeral 1.

Mounted upon the chassis 1 is a subframe, generally designated by the numeral 2. The subframe 2 also forms a trackway for supporting a carriage, generally designated at 3, which is capable of movement horizontally forward and backward relative to the subframe 2, to different positions thereon. This movement is power operated by any suitable means, such as that set forth more in detail in the aforesaid Patent No. Re. 23,546.

Mounted on the carriage 3 is an elevator, generally designated by the numeral 4, which is supported thereby upon one or more hydraulic hoists, generally designated at 5. One end of the hoist 5 is mounted on the carriage 3, while the other end thereof extends upwardly to the upper end of the elevator 4 and supports the latter for raising and lowering movements relative to the carriage. The elevator 4 is mounted for movement either slidably or on rollers, substantially in a vertical plane, and may be raised and lowered in the different positions of the carriage relative to the subframe 2. In this way, the elevator may lift a container from its supported position on the ground into bearing relation with the carriage and hold it in this position while the carriage is moved forward on the subframe 2 of the chassis, after which the container may be set down in its transport position on the subframe.

The container is designated generally at 6. The invention may be applied to any suitable or desired form of container, whether of drop bottom, tip-over, skip, tank, or other types, which may be handled by such transporting equipment. The container 6 is usually provided with lifting pins 7 on opposite ends thereof for detachable engagement by flexible devices, such as chains, generally designated at 8, that extend upward to the top of the elevator. As set forth in the aforesaid patent, No. Re. 23,546, the flexible devices 8 may extend either to anchor points on the elevator 4, or extend over guide sheaves thereon to anchor points on the carriage, whereby double travel of the container is obtained with respect to a predetermined movement of the elevator.

The construction and operation of the transport equipment as described above is set forth more in detail in the above-mentioned patents, without requiring repetition herein.

As shown in Fig. 3, the chassis frame 1 has the subframe 2 supported thereon by intervening spacers, as indicated generally at 9. Usually wooden strips are employed as such spacers, and the construction thereof may vary according to the width of the side members of the chassis frame to which the hoisting mechanism is to be applied. One or more bars 10 may be employed also as supports for the container 6, in suitably mounted position over the chassis frame 1 and subframe member 2, one example of which is illustrated in Fig. 3.

At each lateral side of the chassis frame and extending outwardly therefrom is an outrigger structure, shown more in detail in Figs. 2 to 4, for confining the container 6 in place on the vehicle and for insuring proper seating of the container.

Each such outrigger structure comprises a holder plate 11 secured at its inner edge to the adjacent subframe member 2 and extending outwardly substantially horizontally therefrom, with an upturned section 12 at the outer edge of this plate 11, which section 12 has its upper edge portion bent outwardly at 13. This outrigger structure extends lengthwise of each side of the chassis frame for a distance sufficient to accommodate the container therebetween and to extend over the wheel or wheels of the vehicle at the rear.

The sections 12 and 13 have secured to the outer side thereof an angular filler plate 14 cooperating therewith to form a box girder. The plate 14 may be secured by welding or other suitable manner to the sections 12 and 13 at their respective upper edges. An angle bar 15 is applied to the outer edge of the cradle plate 11, with a downturned side coacting to form a portion of the skirting of the vehicle. Additional skirting portions are shown at 16 and 17 at the front and rear, respectively, connected with the holder plate 11 and extending downwardly therefrom.

The outrigger structure is braced intermediate its length by supporting bars 18 and by stiffener plates 19. The stiffener plates 19 are spaced apart and receive therebetween the upper end of a tie leg 20, which tie leg 20 extends downwardly therefrom with a plate 21 on the lower end thereof secured in suitable manner to the adjacent chassis frame member 1. The plate 21 may be bolted, welded or otherwise attached to the chassis frame member.

A bar 22 is secured by welding or otherwise over the angle between the holder sections 11 and 12, tending to center the container with respect to the upright sections 12.

The upright sections may be braced, if desired, by suitable reinforcing means, such as a pressed channel 23 at the front end of the outrigger structure and by angle bars 24 intermediate the length thereof, which parts may be welded in place or otherwise securely fastened.

Mounted upon each outrigger structure is a retaining device for the container, generally indicated at 25. This retaining device is formed of an upright plate 26, to the inner face of which is secured an abutment member 27. The member 27 is formed of a channel section, shaped to conform to the outwardly extending edge portion 13 of the outrigger structure and having a closed upper end 28, which end portion is inclined. These parts may be welded or otherwise secured upon the outrigger structure in the relation shown in Figs. 2 to 4.

Figure 5:
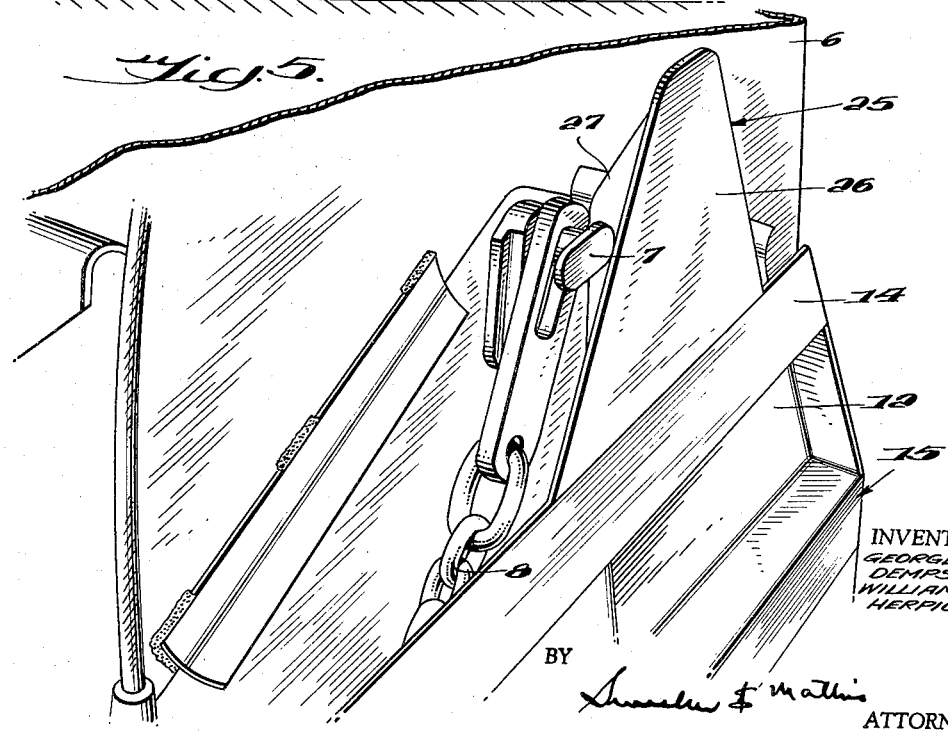
Fig. 5 is a perspective view of the container in locked position.

It will be apparent that the outrigger structures on opposite sides of the vehicle will be fully open at their rear ends for movement of the container into and out of the space between the upright plate sections 12. The relation of the container to these sections 12 and also the retainer members 25 will be apparent from Figs. 4 and 5.

It is also shown that where the container is spaced at its ends from the upright sections 12, the chains and cables forming the supporting connections for the container are retained thereby during transportation, thus tending to prevent the possibility of flapping of the chains or striking objects along the way.

In the operation of the equipment, the raising and lowering of the container with respect to the subframe 2 and the holder plate 11 will be apparent from the above-mentioned patents and need not be described in detail.

In the loading or unloading of the container with respect to the chassis, the elevator 4 should be raised sufficiently so the lifting pins 7 on the container 6 will clear the retainer members 25 on the outrigger structure. In moving the container in to a seated position, the carriage 3 is moved forward until the lifting pins 7 are disposed forwardly of the retainer stops 27. The relation of the container to the outrigger structure should be such that the lifting pins 7 will overlap the retainer stops 27 at both opposite ends, but should be clear of the retainer plates 26, so as to slip between the latter, as shown in Figs. 2 and 4. Thus, the outrigger structure and retainer members 25 will serve to hold the container in place on the chassis against danger of displacement either rearwardly or laterally relative thereto, while the truck is traveling from one point to another. The inclined portion 13, as well as the inclined plate 22 tend to guide the container to a centered position, as it is being lowered into its supported position on the chassis.

As the vehicle reaches the point of dumping or the point of further use of the container, it may be lifted by the hoisting mechanism above referred to so the lifting pins will clear the retaining members 25, after which the carriage can be moved rearwardly to discharge the container from the vehicle.

The structure is simple and inexpensive to apply and avoids any danger but that the container will be locked securely in place on the vehicle during transportation. The locking is secure, even though the container may not be sitting entirely level. The outrigger structure that forms the lock mechanism can be used also as skirting over the wheels, with no appreciable increased cost.

As shown in Figs. 6 and 7, the holder plate is indicated at 11'. An outrigger plate extends upwardly therefrom at each opposite side of the hoisting unit on the chassis frame, as shown at 30. This outrigger plate 30 is provided with offset flanges 31 and 32 at the rear and front edge portions thereof, respectively, and the flange 32 forms an angular shoulder which acts as a retainer for the lifting pin 7 of the container 6, as hereinafter explained. A separate plate 33 is arranged at the front end of the plate 30 in overlapping relation therewith and having a flange 34 turned substantially at right angles to the plate 33. These parts may be welded together to form substantially a box girder structure which will act as a stiffened member to insure of secure retension of the container by engagement of the adjacent lifting pin 7 with this box girder structure at the shoulder 32. An upright brace is shown at 35 intermediate the width of the plate 30, and a bar 36 closes the top thereof.

The upright plates 30 that form the outriggers on opposite sides of the hoisting unit, converge toward each other toward the front of the vehicle (toward the left, as viewed in Fig. 6). As the container 6 is moved forwardly of the hoisting unit over the holder plate 11' thereof, the converging relation of the outrigger plates 30 on opposite sides of the container tend to center the container on the hoisting unit and to guide it into a centered position, in the event that it should be displaced laterally on one side or the other thereof. In moving the container forward, it would be raised high enough on the hoisting unit for the lifting pin 7 to clear the upper edges of the outrigger plates 30 which are protected at the top by the bars 36, but the body of the container may be suspended therebetween and be guided into a centered relation by the converging inner faces of the plates 30. Then, upon lowering of the container to rest on the hoisting unit, as on the supports 10 thereof, the lifting pins 7 will overlap the shoulders 32, thereby to retain the container securely against rearward sliding movement in a seated position on the hoisting unit, in the manner described above.

Front guide plates are shown at 37 mounted at the upper ends of the shoulders 32 and arranged diagonally thereof, converging toward the rear of the vehicle, so as to prevent the container from striking against the shoulders 32 as the container is moved rearward of the vehicle. These guide plates 37 are high enough so as not to intervene with the retention of the lifting pins by the shoulders 32, and yet they serve as effective guides for the body of the container.

In other respects, the construction shown in Figs. 6 and 7 functions in the same manner and with the same results as that set forth in Figs. 1 to 5.

While the invention has been illustrated and described in certain embodiment, it is recognized that variations and changes may be made therein without departing from the invention, as set forth in the claims.

We claim:

1. In transporting equipment, the combination with a vehicle adapted to receive in a seated position thereon of a container having projecting members at opposite ends thereof, of a walled structure on the vehicle in position to restrict movement of the container supported on the vehicle during transportation, upright sections on opposite sides of the structure and extending lengthwise of the vehicle adapted to receive the container therebetween for holding the container in place against lateral displacement therefrom during transportation, upright retaining members seated upon the upright sections and secured thereto in positions for overlapping relation with the projections on the container to hold the container against endwise displacement during transportation, each of said retaining members comprising an upright plate at the outer edge of the upright section, and a box structure secured to the plate and extending inwardly therefrom and downwardly along the inner face of the plate to the upright section.

2. In transporting equipment, the combination with a vehicle adapted to receive in a seated position thereon of a container having projecting members at opposite ends thereof, of a walled structure on the vehicle in position to restrict movement of the container supported on the vehicle during transportation, said structure comprising a plate having sections extending outwardly and upwardly at each lateral side of the vehicle with an outwardly inclined upper edge portion on the upwardly extending plate section, supports connected with the vehicle and holding the plates in place, reinforcing means for the plates, and retainer members mounted on the plates and extending upwardly therefrom, each retainer member including an upright plate at the outer edge of the outwardly inclined portion, and an upwardly extending angle member on the inner face of said upright plate projecting inwardly therefrom and downwardly substantially to the upper edge of the upwardly extending section of the first-mentioned plate in position for overlapping relation with the end projection on the container.

3. In transporting equipment, the combination with a vehicle having a chassis frame, of elevating mechanism mounted on the vehicle, a walled structure mounted on the chassis frame with upwardly extending sections on opposite sides of the chassis frame, a container detachably mounted on the vehicle between the upright sections, said container having projections on opposite ends thereof extending outwardly beyond the upright sections of the structure and adapted to be connected with the elevating mechanism for raising and lowering the container with respect thereto, and retainer members mounted outwardly of the upright sections of the structure in overlapping relation with the end projections and rearwardly of the latter when the container is in seated position on the structure for holding the container against displacement rearwardly of the vehicle during transportation.

4. In transporting equipment, the combination with a vehicle adapted to receive a container in seated position thereon, said container having projections at opposite ends thereof, of retaining members mounted on the vehicle comprising outrigger plates extending in upright relation thereof and elongated lengthwise of the vehicle in position to receive the container between said plates forming outriggers for holding the container in place thereon, and upright shoulders above the outrigger plates intermediate the length thereof and disposed vertically of the inner faces of said plates in position to be engaged by the container projections.

5. In transporting equipment, the combination with a vehicle adapted to receive a container in seated position thereon, said container having projections at opposite ends thereof, of retaining members mounted on the vehicle at opposite sides thereof comprising outrigger plates extending in upright relation to the vehicle and elongated lengthwise of the vehicle in position to receive the container between said plates forming outriggers for restricting movement of the container transversely of the vehicle, and upright shoulders on the inside faces of the plates overlapped by the container projections in normal load carrying position for holding the container against displacement lengthwise of the vehicle.

6. In transporting equipment, the combination with a vehicle adapted to receive a container in seated position thereon, said container having projections at opposite ends thereof, of retaining members mounted on the vehicle comprising outrigger plates extending in upright relation thereof and elongated lengthwise of the vehicle in position to receive the container in place thereon, upright shoulders on the inside faces of the plates overlapped by the container projections for holding the container against displacement lengthwise of the vehicle, said outrigger plates converging toward the front of the vehicle, and front guide plates mounted on the outrigger plates at the upper edges thereof for guiding the container therebetween.

7. In transporting equipment, the combination with a vehicle including a chassis frame, of a hoisting unit mounted on the chassis frame and including subframe members adapted to receive and support a container thereon, separate, upright outrigger plates mounted on and spaced laterally outside the subframe members and extending lengthwise thereof, said outrigger plates being open at the rear end of the subframe to receive the container therebetween and restrict transverse movement of the container when the container rests on the subframe members, and means on the outrigger plates and projecting above the same for engagement by projections on the ends of the container to prevent the container from sliding rearwardly between said outrigger plates.

8. In transporting equipment, the combination with a vehicle including a chassis frame, of a hoisting unit mounted on the chassis frame and including subframe members, a container supported on the subframe members and extending laterally thereof with lifting pins on opposite ends of said container, upright outrigger plates spaced laterally outside the subframe members and receiving the container therebetween with the lifting pins projecting outside the upright planes of said outrigger plates, and means on the outrigger plates and projecting above the same in position for engagement by the lifting pins to prevent the container from sliding rearwardly between said outrigger plates.

9. In transporting equipment, the combination with a vehicle, of a container mounted in a seated position on the vehicle and having projecting members at opposite ends thereof adjacent respectively opposite sides of the vehicle, a holder structure on the vehicle receiving the container supported on the vehicle during transportation, and upright retaining members at opposite sides of the holder structure overlapped by the projecting members on the container and extending above and below said projecting members for holding the container against rearward sliding movement of the vehicle during transportation.

10. In transporting equipment, the combination with a vehicle, of a container mounted in a seated position on the vehicle and having projecting members at opposite ends thereof adjacent respectively opposite sides of the vehicle, a holder structure on the vehicle receiving the container supported on the vehicle during transportation, upright sections on opposite sides of the holder structure receiving the container therebetween, and retainer members mounted on the upright sections of the holder structure overlapped laterally by the projecting members on the container and extending above and below said projecting members for holding the container in place during transportation.

11. In transporting equipment, the combination with a vehicle, of a container mounted in a seated position on the vehicle and having projecting members at opposite ends thereof adjacent respectively opposite sides of the vehicle, a holder structure on the vehicle receiving the container supported on the vehicle during transportation, upright sections on opposite sides of the holder structure and extending lengthwise of the vehicle receiving the container therebetween for holding the container in place against lateral displacement therefrom during transportation, and upright retaining members seated upon the upright sections and secured thereto in overlapping relation with the projections on the container and extending above and below said projections to hold the container against endwise displacement during transportation.

References Cited in the file of this patent

UNITED STATES PATENTS

| | | |
|---|---|---|
| 731,085 | Tichenor | June 16, 1903 |
| 1,477,723 | Smith | Dec. 18, 1923 |
| 1,710,737 | Kiesel | Apr. 30, 1929 |
| 1,862,632 | Perin | June 14, 1932 |
| 1,957,497 | Galanot | May 8, 1934 |
| 2,281,183 | Dempster | Apr. 28, 1942 |
| 2,324,747 | Weissert | July 20, 1943 |
| 2,424,429 | Bamberg | July 22, 1947 |
| 2,437,806 | Dempster | Mar. 16, 1948 |
| 2,702,142 | Jones | Feb. 15, 1955 |
| 2,760,815 | LaBorde | Aug. 28, 1956 |
| 2,763,383 | McCoy | Sept. 18, 1956 |